United States Patent [19]
DeMaio

[11] Patent Number: 5,452,541
[45] Date of Patent: Sep. 26, 1995

[54] MODULAR PLANT GROWTH APPARATUS

[76] Inventor: Anthony DeMaio, 58 Easy Rudder La., West Haven, Conn. 06516

[21] Appl. No.: 286,389

[22] Filed: Aug. 5, 1994

Related U.S. Application Data

[63] Continuation of Ser. No. 51,992, Apr. 26, 1993, abandoned.

[51] Int. Cl.$^6$ .................................................. A01G 1/08
[52] U.S. Cl. ................................. 47/33; 47/25; 52/102; 404/7
[58] Field of Search ............................... 47/25; 404/7, 8; 52/102, 585; 411/23, 82

[56] References Cited

U.S. PATENT DOCUMENTS

| | | | |
|---|---|---|---|
| 739,854 | 9/1903 | Gest | 404/7 |
| 919,788 | 4/1909 | Smith | 404/7 |
| 2,978,837 | 4/1961 | Daniels | 47/25 |
| 3,037,433 | 6/1962 | Maher | 404/7 |
| 4,681,477 | 7/1987 | Fischer | 411/82 |
| 4,844,652 | 7/1989 | Schroughan | 404/7 |
| 4,964,619 | 10/1990 | Glidden | 47/33 |
| 4,986,025 | 1/1991 | Imterial | 47/25 |
| 5,092,076 | 3/1992 | Terreta | 52/102 |
| 5,161,916 | 11/1992 | White | 411/82 |
| 5,232,301 | 8/1993 | Wagner | 52/585 |

FOREIGN PATENT DOCUMENTS

| | | | |
|---|---|---|---|
| 18225 | 7/1929 | Australia | 52/102 |
| 1333889 | 6/1963 | France | 404/7 |
| 2372292 | 7/1978 | France | 52/102 |

*Primary Examiner*—Henry E. Raduazo

[57] ABSTRACT

A new and improved modular plant growth prevention apparatus is used in conjunction with a vertical surface extending vertically from the ground and includes a plurality of plant growth prevention modules which are placed on the ground a predetermined distance from the vertical surface. A plurality of first connector assemblies connect the plant growth prevention modules to each other. A plurality of second connector assemblies connect the plant growth prevention modules to the ground. Each of the plant growth prevention modules includes a vegetation-impervious horizontal portion for placement on the ground. The vegetation-impervious horizontal portion includes an outer edge and an inner end. A length between the outer edge and the inner end is equal to or greater than a distance between an outside surface of a wheel assembly and an outside edge of a blade of a mower. A vertical portion projects upward from the inner end of the vegetation-impervious horizontal portion, and the vertical portion prevents the mower from moving closer to the vertical surface than the predetermined distance between a plant growth prevention module and the vertical surface. The vegetation-impervious horizontal portion covers a portion of the ground which is not susceptible to being passed over by the blade of the mower; whereby the vegetation-impervious horizontal portion prevents vegetation from growing in a portion of the ground which is not capable of being passed over by the blade of the mower.

4 Claims, 5 Drawing Sheets

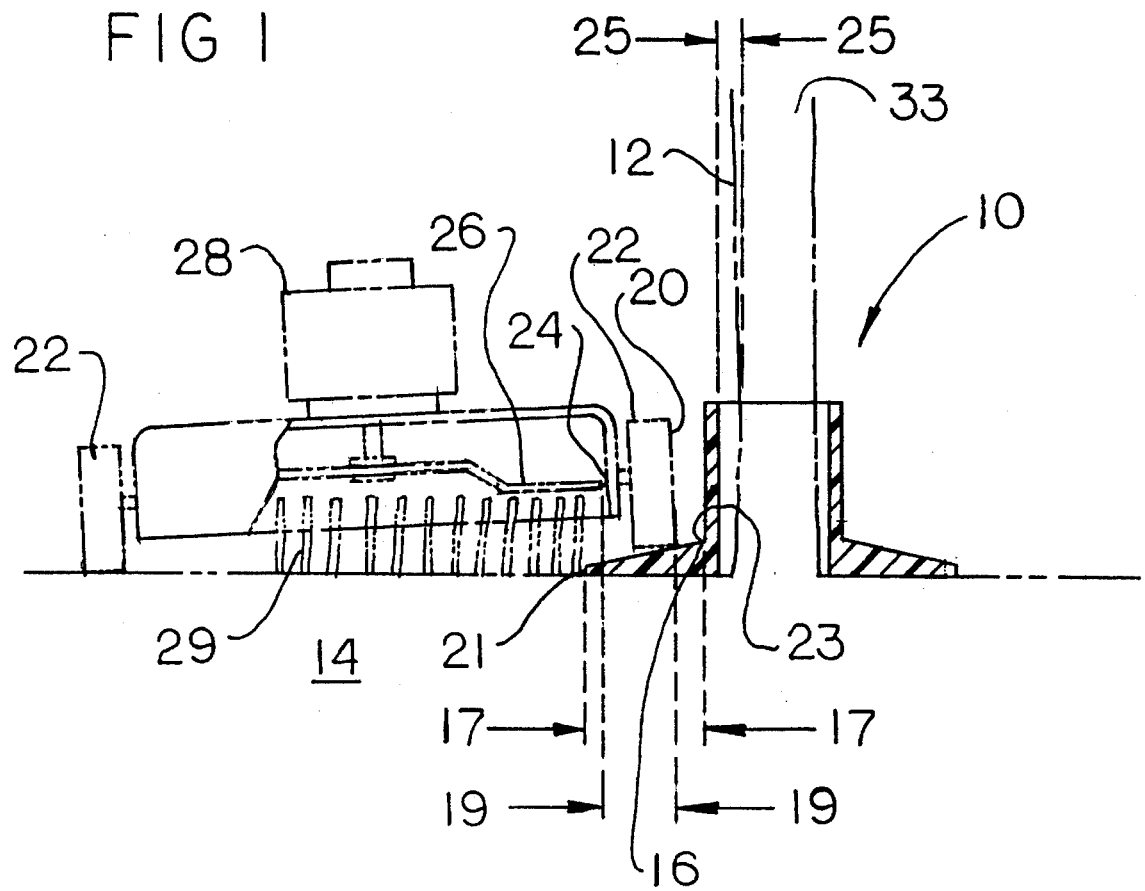# 
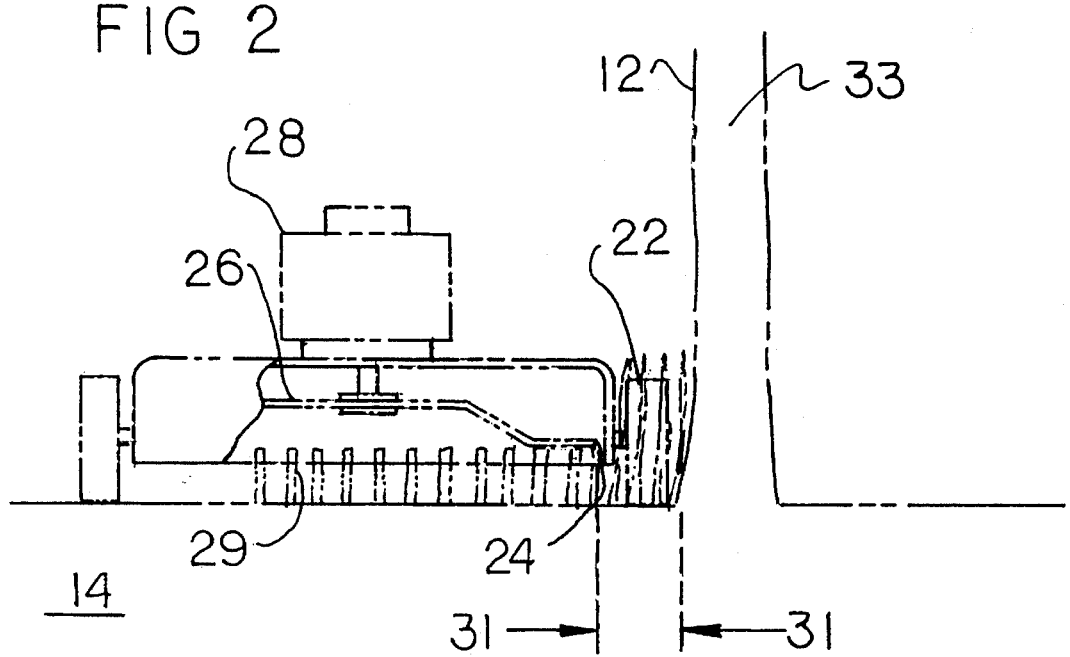

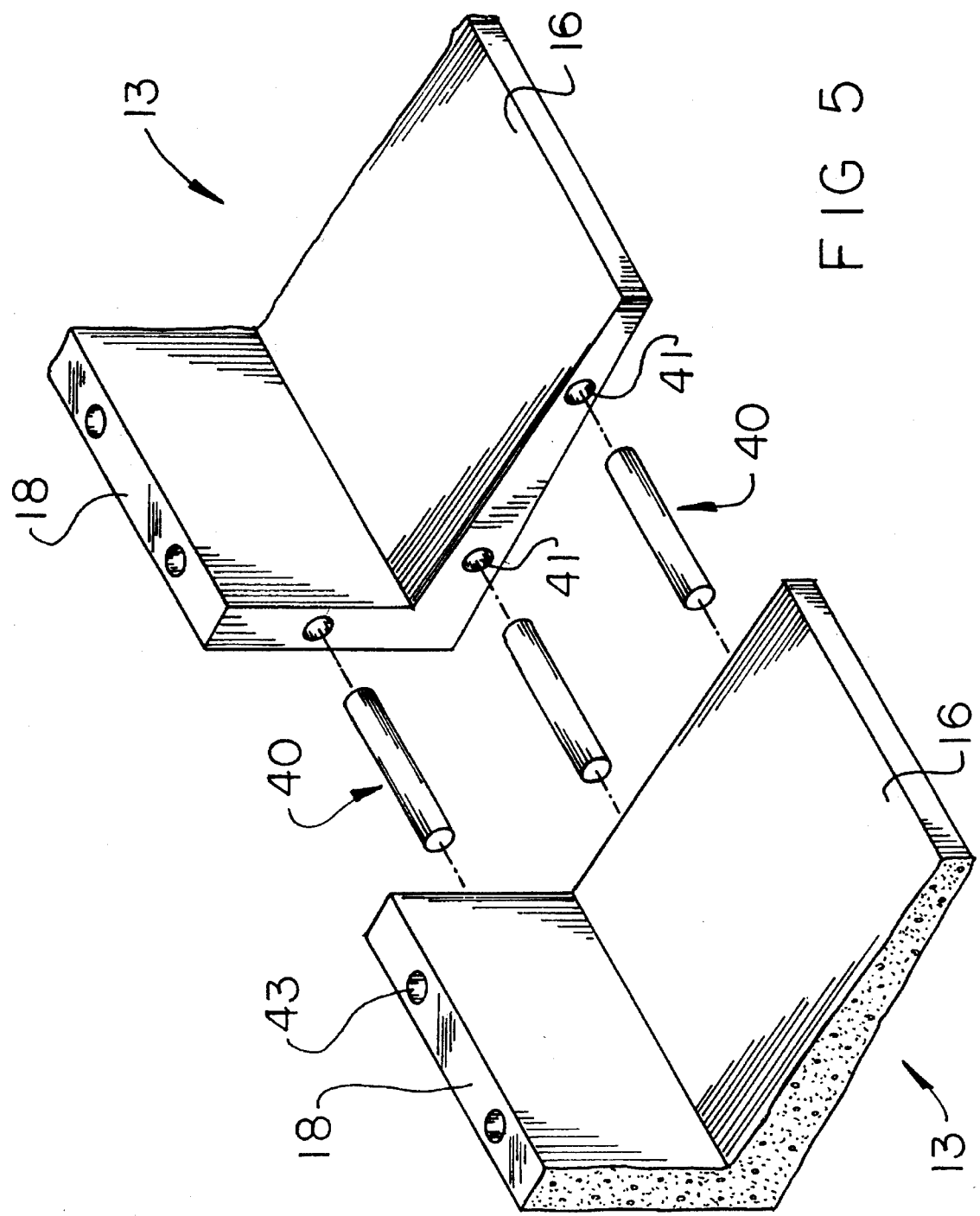

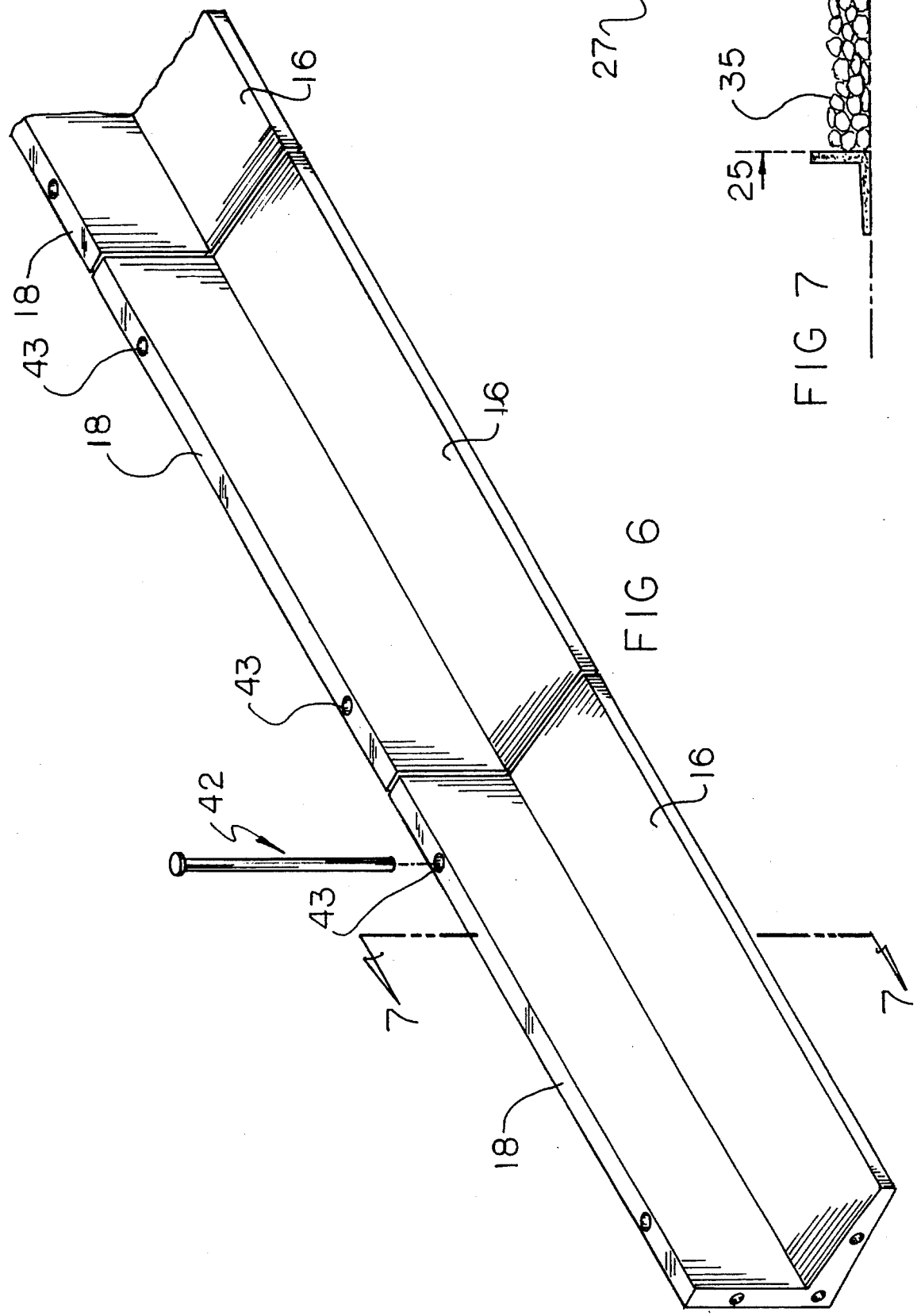

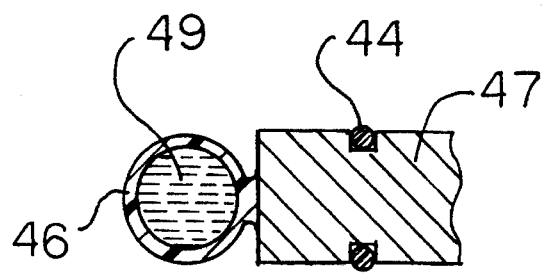
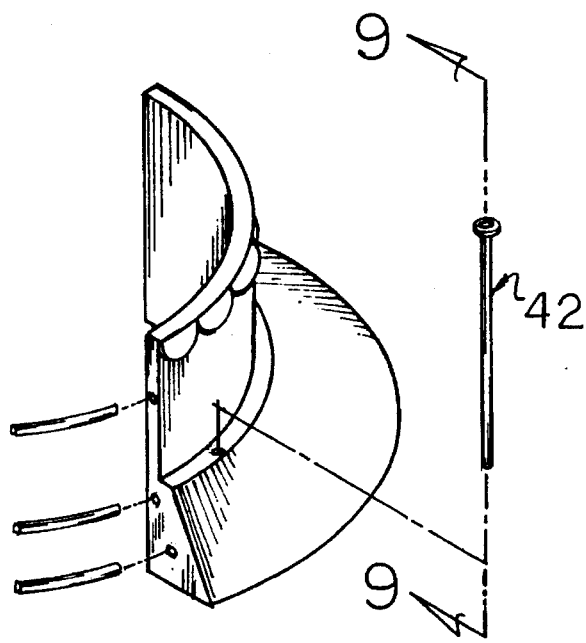
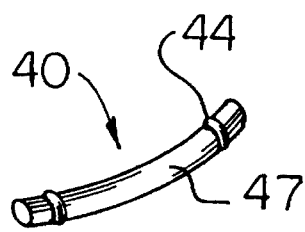
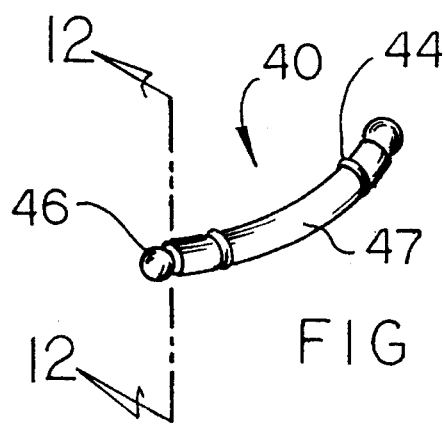
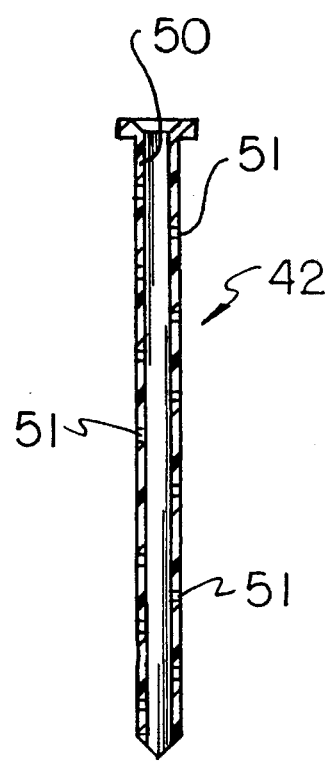

1

MODULAR PLANT GROWTH APPARATUS

This application is a contiuation of application 08/051,992, filed Apr. 26, 1993, now abadoned.

BACKGROUND OF THE INVENTION

1. Field of the Invention

The present invention relates generally to devices to prevent plant growth outdoors, and more particularly, to devices for preventing growth of grass and weeds at the bases of trees, shrubbery, fences, walls of a building, lamp posts, and any area that cannot be reached by the blade of a mower.

2. Description of the Prior Art

Grass and weeds that grow on a lawn are generally cut by a mower when the length is undesirably long. However, the blade of the mower does reach right up to the sides of vertical surfaces such as the bases of trees, shrubbery, fences, walls of a building, lamp posts, and any other vertical surface that is adjacent to the lawn that is cut. To cut the lawn that is not cut by the mower near the vertical surfaces, either manual trimming or trimming with a separate powered implement must be done. For many people, it would be very inconvenient and laborious to trim around the edges of the vertical structures which are missed by the mower. In this respect, it would be desirable if a device were provided that avoided the necessity of trimming around the edges of vertical structures after a mowing operation.

A conventional alternative to manual trimming is the use of a powered (either electrically or gasoline powered) apparatus specifically designed to trim plant matter missed by a mower blade. One undesirable aspect of using a powered trimmer is the extra power consumption that need be employed. Another undesirable aspect of using a powered trimmer is the extra work that must be employed. In this respect, a lawn mowing chore is multiplied to become a lawn mowing chore and an edge trimming chore. In this respect, it would be desirable to provide a device which avoided the need to perform an edge trimming chore when a lawn mowing chore has been done.

A conventional method that is sometimes used to reduce the need for edge trimming around vertical surfaces is the use of a layer of gravel or mulch placed adjacent to the vertical surfaces. The purposed of the gravel or mulch is to prevent growth of the lawn or weeds where the gravel or mulch is placed. Gravel or mulch have a number of undesirable characteristics. Both are composed of relatively small particles which are susceptible to be blown away by winds or washed away by rain water. In this respect, it would be desirable if a device were provided that prevented the growth of lawn or weeds near vertical surfaces and that was not susceptible to being blown away by winds or washed away by rain.

Moreover, with gravel and mulch, because of their particulate nature, blades of grass or shafts of weeds often grow up between individual particles of the gravel or mulch. In this respect, it would be desirable if a device were provided which avoided grass or weeds from growing between particulate material.

A number of edging devices are disclosed in the prior art of United States patents. Some examples of such devices are disclosed in the following U.S. Pat. Nos.: 3,762,113; 4,907,783; 5,020,272; 5,067,273; and Des. 276,494. All of these cited patents have one undesirable feature in common. They include vertically placed edging devices which substitute the vertical surfaces of the edging devices for the vertical surfaces of the that are protected by the edging devices. Thus, even with the patented devices, the blade of a mower does reach right up to the sides of the vertical edger surfaces. Therefore, even with the patented devices, a separate trimming operation must be performed to cut the lawn or weeds missed by the mower blade.

Thus, while the foregoing body of prior art indicates it to be well known to use vertical edger devices near vertical surfaces, the prior art described above does not teach or suggest a modular plant growth prevention apparatus which has the following combination of desirable features: (1) avoiding the necessity of trimming around the edges of vertical structures after a mowing operation; (2) avoiding using a powered trimmer and the extra power consumption that need be employed; (3) avoiding the need to perform an edge trimming chore when a lawn mowing chore has been done; (4) preventing the growth of lawn or weeds near vertical surfaces by means that are not susceptible to being blown away by winds or washed away by rain; and (5) preventing grass or weeds from growing between particulate material. The foregoing desired characteristics are provided by the unique modular plant growth prevention apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved modular plant growth prevention apparatus which is used in conjunction with a vertical surface extending vertically from the ground. The modular plant growth prevention apparatus includes a plurality of plant growth prevention modules which are placed on the ground a predetermined distance from the vertical surface. A plurality of first connector assemblies connect the plant growth prevention modules to each other. A plurality of second connector assemblies connect the plant growth prevention modules to the ground. Each of the plant growth prevention modules includes a vegetation-impervious horizontal portion for placement on the ground. The vegetation-impervious horizontal portion includes an outer edge and an inner end. A length between the outer edge and the inner end is equal to or greater than a distance between an outside surface of a wheel assembly and an outside edge of a blade of a mower. A vertical portion projects upward from the inner end of the vegetation-impervious horizontal portion, and the vertical portion prevents the mower from moving closer to the vertical surface than the predetermined distance between a plant growth prevention module and the vertical surface. The vegetation-impervious horizontal portion covers a portion of the ground which is not susceptible to be being passed over by the blade of the mower; whereby the vegetation-impervious horizontal portion prevents vegetation from growing in a portion of the ground which is not capable of being passed over by the blade of the mower.

The second connector assemblies connect the plant growth prevention modules to the ground and include second connecting rods connected to the vertical portions for securing the vertical portions and the vegetation-impervious horizontal portions to the ground.

More specifically, the second connector assemblies include second connecting rod assemblies for connecting the plant growth prevention modules to the ground; and the vertical portion includes channels for receiving the second connecting rod assembly. A portion of the second connecting rod assemblies extend through the channels, and a portion of the second connecting rod assemblies enter the ground.

The plant growth prevention module can include a straight vertical portions; or the vertical portions can be curved. Four plant growth prevention modules, each extending 90 degrees around the vertical surface, form a circle of 360 degrees around the vertical surface.

More generally with respect to curved plant growth prevention modules which include curved vertical portions and vegetation-impervious horizontal portions that have curved outer edges, "n" plant growth prevention modules may each extend 360/"n" degrees around the vertical surface to form a circle of 360 degrees around the vertical surface.

The first connector assembly includes first connecting rod assemblies for connecting adjacent plant growth prevention modules together. The plant growth prevention modules include wells for receiving the connecting rod assemblies.

The first connecting rod assemblies may include tensioning elements for applying tension to walls of the wells for providing a tight fit between the first connecting rod assemblies and the wells, whereby adjacent plant growth prevention modules are secured tightly to each other. More specifically, the first connecting rod assemblies may include a shaft portion and a plurality of O-ring portions connected to the shaft portion.

The first connecting rod assemblies may include adhesive applicators for applying adhesive to walls of the wells for providing a tight fit between the first connecting rod assemblies and the wells, whereby adjacent plant growth prevention modules are secured tightly to each other.

The second connecting rod assemblies can include a hollow portion and a perforated wall portion, such that a chemical anti-foliant can be placed into the hollow portion and dispensed through the perforated wall portion into the ground.

The vertical surfaces may include a vertical portion of a plant, a vertical portion of a tree, or a vertical portion of a building.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved modular plant growth prevention apparatus which has all of the advantages of the prior art and none of the disadvantages.

It is another object of the present invention to provide a new and improved modular plant growth prevention apparatus which may be easily and efficiently manufactured and marketed.

It is a further object of the present invention to provide a new and improved modular plant growth prevention apparatus which is of durable and reliable construction.

An even further object of the present invention is to provide a new and improved modular plant growth prevention apparatus which is susceptible of a low cost of manufacture with regard to both materials and labor, and which accordingly is then susceptible of low prices of sale to the consuming public, thereby making such modular plant growth prevention apparatus available to the buying public.

Still yet a further object of the present invention is to provide a new and improved modular plant growth prevention apparatus that avoids the necessity of trimming around the edges of vertical structures after a mowing operation.

Still another object of the present invention is to provide a new and improved modular plant growth prevention apparatus that avoids using a powered trimmer and the extra power consumption that need be employed.

Yet another object of the present invention is to provide a new and improved modular plant growth prevention apparatus which avoids the need to perform an edge trimming chore when a lawn mowing chore has been done.

Even another object of the present invention is to provide a new and improved modular plant growth prevention apparatus that prevents the growth of lawn or weeds near vertical surfaces and that is not susceptible to being blown away by winds or washed away by rain.

Still a further object of the present invention is to provide a new and improved modular plant growth prevention apparatus which prevents grass or weeds from growing between particulate material.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a first preferred embodiment of the modular plant growth prevention apparatus of the invention in use around a tree as a mower, shown in partial cross section, is adjacent the embodiment of the invention.

FIG. 2 is a side view showing a Prior Art use of a mower adjacent to a tree.

FIG. 5 is an exploded perspective view of a second embodiment of the modular plant growth prevention apparatus of the invention.

FIG. 6 is a perspective view of the embodiment of the invention shown in FIG. 5 in an assembled condition.

FIG. 7 is a cross-sectional view of the embodiment of the invention shown in FIG. 6 taken along the line 7—7 thereof.

FIG. 8 is a partially exploded perspective view of a third embodiment of the modular plant growth prevention apparatus of the invention that employs a dispenser for a chemical anti-foliant material.

FIG. 9 is an enlarged perspective view of the weed killer dispenser shown in FIG. 8 taken along the line 9—9 thereof.

FIG. 10 is a perspective view of an embodiment of a connecting rod which includes resilient O-rings to assist in joint adjacent modules of the invention together.

FIG. 11 is a perspective view of another connecting rod, one which includes bulbs containing adhesive at its ends.

FIG. 12 is an enlarged cross-sectional view of the connecting rod shown in FIG. 11 taken along the line 12—12.

DESCRIPTION OF THE PREFERRED EMBODIMENT

With reference to the drawings, a new and improved modular plant growth prevention apparatus embodying the principles and concepts of the present invention will be described.

Figure 3:
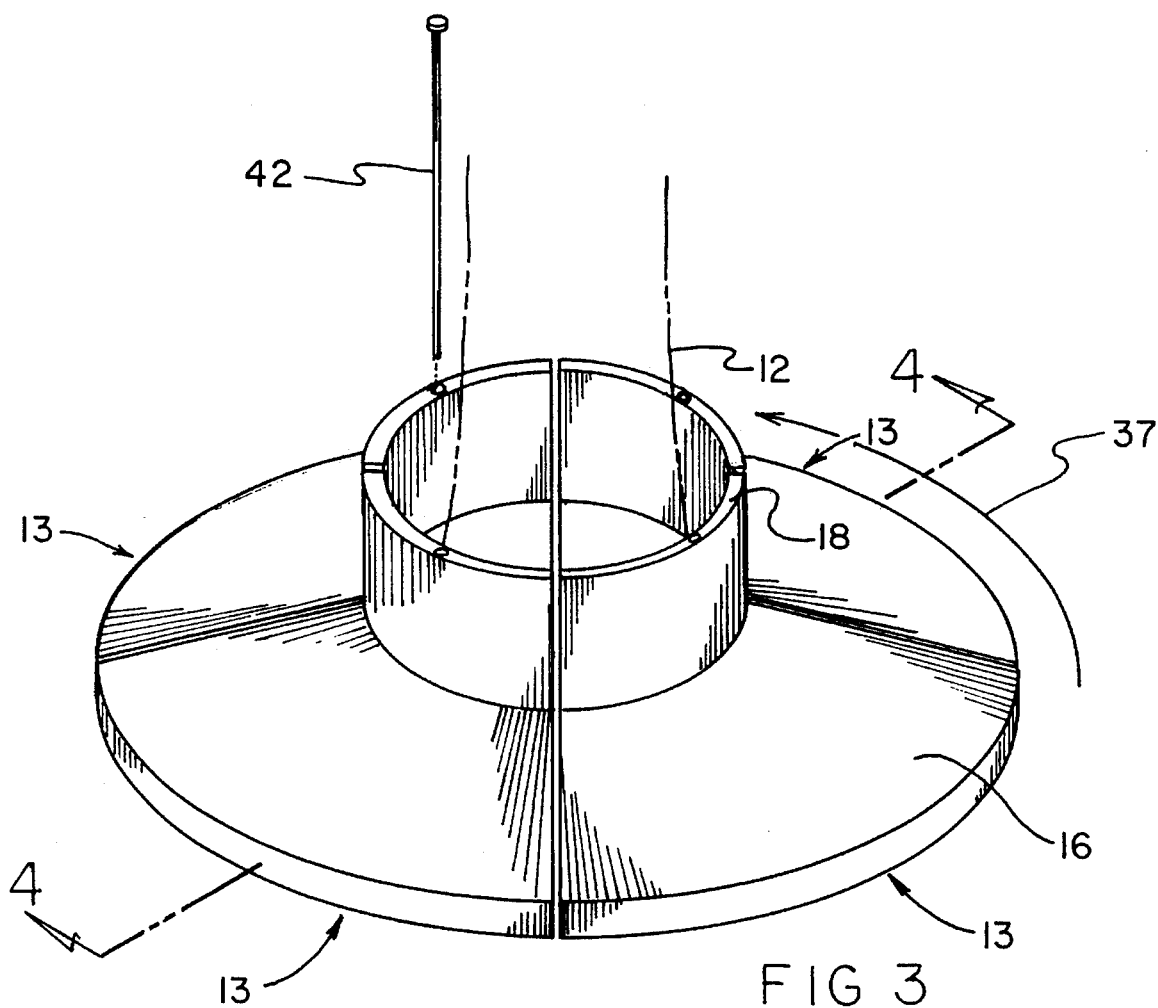
FIG. 3 is an enlarged perspective view of the embodiment of the invention shown in FIG. 1.
Figure 4:
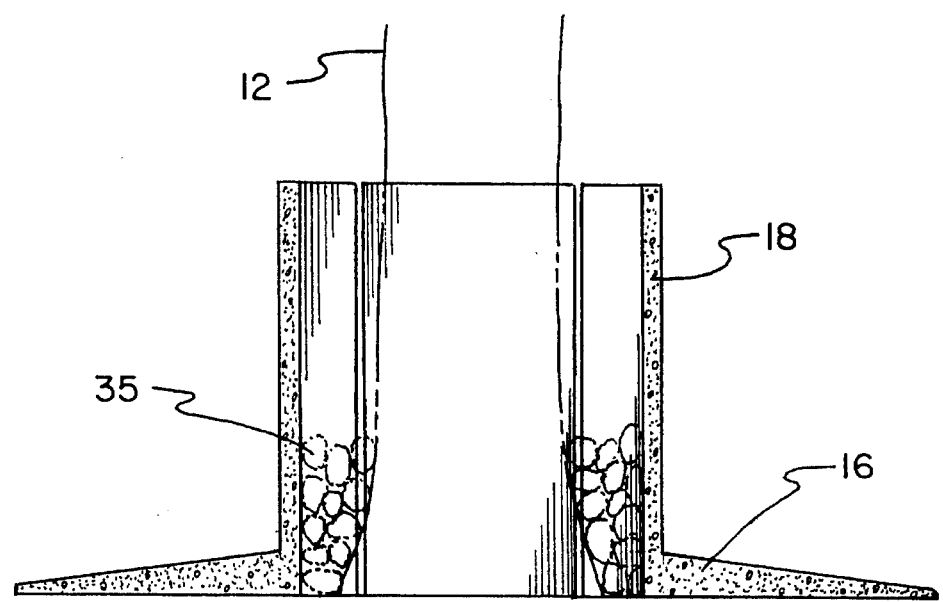
FIG. 4 is a cross-sectional view of the embodiment of the invention shown in FIG. 3 taken along the line 4—4 thereof.

Turning initially to FIGS. 1, 3, and 4, there is shown a first exemplary embodiment of the modular plant growth prevention apparatus of the invention generally designated by reference numeral 10. The modular plant growth prevention apparatus 10 of the invention is used in conjunction with a vertical surface 12 extending vertically from the ground 14 and includes a plurality of plant growth prevention modules 13 which are placed on the ground 14 a predetermined distance 25 from the vertical surface 12. First connector assemblies connect the plant growth prevention modules 13 to each other. Second connector assemblies connect the plant growth prevention modules 13 to the ground 14.

Each of the plant growth prevention modules 13 includes a vegetation-impervious horizontal portion 16 for placement on the ground 14. The vegetation-impervious horizontal portion 16 includes an outer edge 21 and an inner end 23. A length 17 between the outer edge 21 and the inner end 23 is equal to or greater than a distance 19 between an outside surface 20 of a wheel assembly 22 and an outside edge 24 of a blade 26 of a mower 28. Satisfactory lengths of the vegetation-impervious horizontal portion 16 depend upon the design of the mower 28. However, generally speaking, the lengths of the vegetation-impervious horizontal portion 16 can be in a range of from 4–8 inches.

A vertical portion 18 projects upward from the inner end 23 of the vegetation-impervious horizontal portion 16. The vertical portion 18 prevents the mower 28 from moving closer to the vertical surface 12 than the predetermined distance 25 between the vertical portion 18 and the vertical surface 12. The height of the vertical portion 18 can be any desired height and is generally in a range of 4–8 inches. If desired, for decorative purposes, the top edge of the vertical portion 18 can be scalloped.

The vegetation-impervious horizontal portion 16 covers a portion of the ground 14 which is not susceptible of being passed over by the blade 26 of the mower 28, whereby the vegetation-impervious horizontal portion 16 prevents vegetation from growing in a portion of the ground 14 which is not capable of being passed over by the blade 26 of the mower 28. Therefore, since vegetation does not grow in the portion of the ground 14 covered by the vegetation-impervious horizontal portion 16, this portion of the ground need not be trimmed even though the mower 28 does not reach this portion of the ground 14. Where the ground 14 is not protected by the vegetation-impervious horizontal portion 16, grass 29 grows and is cut by the mower blade 26. If desired, before installing the plant growth prevention modules 13 of the invention, the portion of the ground 14 to be covered by the vegetation-impervious horizontal portion 16 may be first treated with a weed blocker or killer or anti-foliant material.

In sharp contrast, the prior art pattern of cutting of the grass 29 by a mower 28 near a vertical surface 12 is shown in FIG. 2. More specifically, the vertical surface 12 is the side of a tree 33. With the prior art, there is a distance 31 between the vertical surface 12 and the outside edge 24 of the blade 26 of the mower 28. It is seen in FIG. 2 that within this distance 31, the grass 29 is not cut by the blade 26 of the mower 28. Therefore, once the mower 28 leaves this area, the grass 29 in the distance 31 between the outside edge 24 of the blade 26 and the vertical surface 12 will still need to be trimmed, either manually or with a powered trimmer. The need for such further trimming is eliminated by using the modular plant growth prevention apparatus 10 of the invention.

Second connector assemblies connect the plant growth prevention modules 13 to the ground 14. The second connector assemblies include second connector rod assemblies 42 which are connected to the vertical portion 18 of the plant growth prevention modules 13 for securing the vertical portions 18 and the vegetation-impervious horizontal portions 16 to the ground 14. The vertical portion 18 includes channels 43 for receiving the second connecting rod assemblies 42. A portion of the second connecting rod assemblies 42 extend through the channels 43, and a portion of the second connecting rod assemblies 42 enter the ground 14 when the second connecting rod assemblies 42 are installed.

As shown in FIGS. 1, 3, 4, and 8, the vertical portion 18 can be curved. Alternatively, as shown in FIGS. 5–7, the plant growth prevention module 13 can include a straight vertical portion 18. The plant growth prevention modules 13 having straight vertical portions 18 are especially suitable for use a predetermined distance 25 from straight vertical surfaces 12 such as the wall 27 of a building shown in FIG. 7. Convenient lengths for the straight vertical portions 18 can be in a range of 10–30 inches.

More specifically, as shown in FIG. 3, four plant growth prevention modules 13, each extending 90 degrees (reference number 37) around the vertical surface 12, form a circle of 360 degrees around the vertical surface 12.

More generally with respect to curved plant growth prevention modules 13 which include curved vertical portions 18 and vegetation-impervious horizontal portions 16 that have curved outer edges 21, "n" plant growth prevention modules 13 may each extend 360/"n" degrees around the vertical surface 12 to form a circle of 360 degrees around the vertical surface 12. In accordance with this rule, six curved plant growth prevention modules 13 would each extend 60 degrees around a circular vertical surface 12. Also, eight curved plant growth prevention modules 13 would each extend 45 degrees around a circular vertical surface 12.

The first connector assembly includes first connecting rod assemblies 40 for connecting adjacent plant growth prevention modules 13 together. The plant growth prevention modules 13 include wells 41 for receiving the connecting rod assemblies 40.

As shown in FIGS. 10–12, the first connecting rod assemblies 40 may include tensioning elements 44 for applying tension to interior walls of the wells 41 for providing a tight fit between the first connecting rod assemblies 40 and the wells 41, whereby adjacent plant growth prevention modules 13 are secured tightly to each other. More specifically, the first connecting rod assemblies 40 include a shaft portion 47 and a plurality of O-ring portions 44 connected to the shaft portion 47.

As shown in FIGS. 11–12, the first connecting rod assemblies 40 include adhesive applicator 46 for applying adhesive to walls of the wells 41 for providing a tight fit between the first connecting rod assembly 40 and the wells 41, whereby adjacent plant growth prevention modules 13 are secured tightly to each other. When a first connecting rod assembly 40 is jammed into a well 41, the adhesive applicator is ruptured, and adhesive material 49 flows between the shaft portion 47 of the first connecting rod assembly 40 and the interior wall of the well 41.

As shown in FIGS. 8–9, the second connecting rod assemblies 42 can include a hollow portion 50 and a perforated wall portion 51, such that a chemical anti-foliant can be placed into the hollow portion 50 and dispensed through the perforated wall portion 51 into the ground 14.

The vertical surfaces may include a vertical portion of a plant, a vertical portion of a tree, or a vertical portion of a building.

It is noted that the predetermined distance 25 of the plant growth prevention modules 13 from the vertical surface 12 can be relatively small, as shown in FIGS. 1 and 3, or relatively large as shown in FIG. 7. In FIGS. 1 and 3, the plant growth prevention modules 13 are placed flush up against the vertical surfaces 12. It is also noted that the space between the plant growth prevention modules 13 and the vertical surface 12 can be filled with extraneous material, such as a quantity of gravel 35 shown in FIGS. 4 and 7. Wood chips or mulch could be substituted for the gravel 35.

The plant growth prevention modules 13 of the modular plant growth prevention apparatus of the invention can be made from inexpensive and durable plastic or concrete materials. The first connecting rods can be made from rust-resistant plastic or aluminum rods. The second connecting rods can be made from aluminum nails.

It is apparent from the above that the present invention accomplishes all of the objects set forth by providing a new and improved modular plant growth prevention apparatus that is low in cost, relatively simple in design and operation, and which may advantageously be used to avoid the necessity of trimming around the edges of vertical structures after a mowing operation. Also, with the invention, use of a powered trimmer and the extra power consumption therewith need not be employed. With the invention, the need to perform an edge trimming chore when a lawn mowing chore has been done is avoided. With the invention, a device is provided that prevents the growth of lawn or weeds near vertical surfaces in a way that is not susceptible to being blown away by winds or washed away by rain. With the invention, a device is provided which avoids the problem of grass or weeds growing between particles of particulate material.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A modular plant growth prevention apparatus for use in conjunction with a vertical plant surface extending vertically from the ground, comprising:

a plurality of plant growth prevention modules which are placed on the ground a predetermined distance from the vertical plant surface, first connector assembly means for connecting said plant growth prevention modules to each other, and second connector assembly means for connecting said plant growth prevention modules to the ground, wherein each of said plant growth prevention modules includes, a vegetation-impervious horizontal portion, for placement on the ground, which includes an outer edge and an inner end, said vegetation-impervious horizontal portion including a length between said outer edge and said inner end that is equal to or greater than a distance between an outside surface of a wheel assembly and an outside edge of a blade of a mower, and a vertical portion projecting upward perpendicularly from said inner end of said vegetation-impervious horizontal portion, said vertical, upward projecting portion capable of being placed next to a coextensive portion of the vertical plant surface, said vertical portion serving to prevent the mower from moving closer to the vertical plant surface than said predetermined distance between said vertical portion and the vertical plant surface, wherein said vegetation-impervious horizontal portion covers a portion of the ground which is not susceptible to be being passed over by the blade of the mower, whereby said vegetation-impervious horizontal portion prevents vegetation from growing in a portion of the ground which is not capable of being passed over by the blade of the mower, wherein said first connector assembly means include first horizontally extending connecting rod assembly means for connecting adjacent sides of adjacent plant growth prevention modules together between adjacent vertical portions and between adjacent vegetation-impervious horizontal portions, and said plant growth prevention modules include horizontally extending wells in respective adjacent sides of said respective vertical portions and said respective vegetation-impervious horizontal portions for receiving said horizontally extending connecting rod assembly means, and wherein said second connector assembly means include second connecting rod assembly means, wherein said vertical portions of said plant growth prevention modules include channels for receiving said second connecting rod assembly means for securing said vertical portion and said vegetation-impervious horizontal portion to the ground.

2. The apparatus described in claim 1 wherein a plant growth prevention module includes a curved vertical portion.

3. The apparatus described in claim 1 wherein four plant growth prevention modules each extend 90 degrees around the vertical plant surface to form a circle of 360 degrees around the vertical plant surface.

4. The apparatus described in claim 1 wherein "n" plant growth prevention modules extend 360/"n" degrees around the vertical plant surface to form a circle of 360 degrees around the vertical plant surface.

* * * * *